United States Patent [19]

Meyers

[11] 3,951,233

[45] Apr. 20, 1976

[54] COLLAPSIBLE SAWHORSE

[76] Inventor: Daniel Meyers, R.D. No. 6, Box 138, Somerset, Pa. 15501

[22] Filed: Sept. 22, 1975

[21] Appl. No.: 615,217

[52] U.S. Cl. ................................ 182/155; 182/181; 182/225

[51] Int. Cl.[2] ........................................ F16M 11/00

[58] Field of Search ............ 182/155, 153, 181–186, 182/224–226; 248/439, 166

[56] References Cited

UNITED STATES PATENTS

| | | | |
|---|---|---|---|
| 1,501,088 | 7/1924 | Anderson | 182/155 |
| 1,778,566 | 10/1930 | Pitner | 182/155 |
| 2,216,187 | 10/1940 | Dion | 182/155 |
| 3,198,286 | 8/1965 | Wilson | 182/155 |
| 3,618,704 | 11/1971 | Smith | 182/155 |

*Primary Examiner*—Reinaldo P. Machado
*Attorney, Agent, or Firm*—Parmelee, Miller, Welsh & Kratz

[57] ABSTRACT

A collapsible sawhorse which is strong and durable but which may be collapsed into a small package which is easily stored and carried, without the use of tools and without the necessity for loosening any parts. When the legs are in the extended position, the load bearing member rests directly on the top surface of the legs so as to provide solid support for the load resting upon the sawhorse.

5 Claims, 6 Drawing Figures

COLLAPSIBLE SAWHORSE

BACKGROUND OF THE INVENTION

1. Field of the Invention

This invention relates generally to structures known as sawhorses or trestles, and more specifically to sawhorses having collapsible legs so as to allow for compact storage of the device.

2. Prior Art

Sawhorses are devices which have been used for many years by carpenters, painters and other individuals who need a basic supporting surface which is raised from the floor, and upon which can be placed either scaffolding upon which to stand, or a workpiece upon which work is to be performed. Since these devices are so basic and necessary in various areas, attempts have been made to reduce the size and bulkiness of sawhorses so as to make them more easily stored and carried. Typically, these designs have incorporated pairs of legs which are braced apart by a collapsible cross brace. When the sawhorse is to be collapsed, the cross brace is folded or removed to bring the legs together, and in a second movement the legs are then swung up toward the horizontal member. Devices of this type are shown in U.S. Pat. Nos. 1,143,397; 1,298,867; 1,881,755; 2,312,956; 2,828,165; and 3,481,430. In addition to the extra effort and time involved in first collapsing the pair of legs and then swinging the legs up toward the horizontal member, these designs typically provide for latches or bolts which must be loosened prior to collapsing the device. When the device is erected again, these latches or bolts must be replaced or tightened. A design which did not involve collapsing the pair of legs prior to pivoting the legs up to the horizontal member is shown in U.S. Pat. No. 1,636,342. However, this design leaves the legs protruding from the side of the horizontal member when the sawhorse is collapsed and thus the collapsed sawhorse is not as compact as it could otherwise be. To overcome these problems, brackets have been devised which allow for folding of legs of sawhorses without some of the above-mentioned problems. Brackets of this type are shown in U.S. Pat. Nos. 409,544 and 3,618,704.

The present invention overcomes the above disadvantages and provides for a sawhorse which can be more easily folded into a structure which is more compact than the prior structures. There is no need to disconnect any latches or loosen any bolts, and yet the structure, when upright, is strong and capable of supporting a heavy load.

SUMMARY OF THE INVENTION

The present invention is a collapsible sawhorse having a horizontally disposed support member of T-shaped cross section including a vertical portion and a horizontal portion. Four wedges are attached in opposing pairs to the vertical portion of the support member with the wider portion of each wedge being away from the horizontal portion of the support member. Pivotal connecting means are attached to the wedges, each of said connecting means passing through an opening in a leg and securing the leg to the wedge. Four of these tapered legs are attached to the wedges, each of said legs being pivotally attached to one of the wedges at a point proximate the wider end of the leg. The wider end of each leg has an arcuate portion and a flat beveled portion such that when the narrow end of a leg is extended away from the support member the flat beveled portion of the leg fits flush against the horizontal portion of the support member and gives support thereto. The pivotal connecting means may be a threaded connector such as a hollow tube with internal threads or a bolt with external threads. If it is desired to have the legs longer than the distance between the threaded connectors, a slot may be provided in each leg so as to allow for a sliding movement prior to folding the longer legs.

DESCRIPTION OF THE PREFERRED EMBODIMENT

Figure 1:
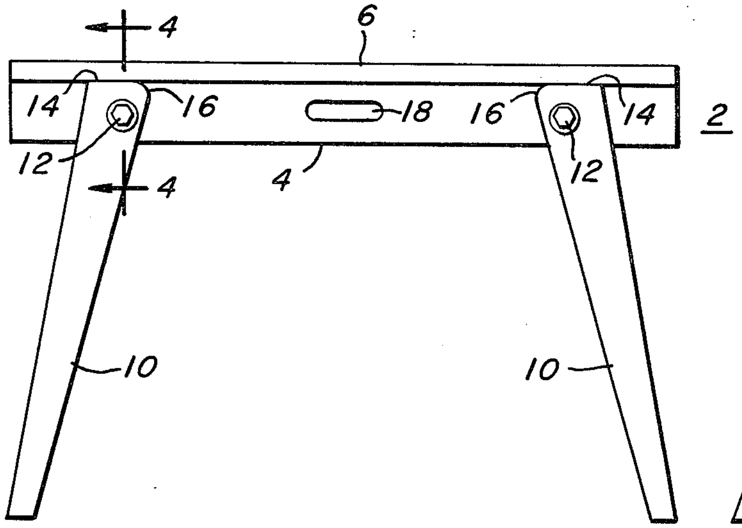
FIG. 1 is a side elevation of the collapsible sawhorse of the present invention in its extended position.

As shown in FIG. 1, a horizontally disposed T-shaped support member 2 includes a vertical portion 4 and a horizontal portion 6 upon which the workpiece or scaffolding may be rested. Four wedges 8 are attached to the vertical portion 4 of the support member 2 in opposing pairs. These wedges 8 are attached to the support member 2 with the wider portion of each wedge 8 being away from the horizontal portion 6 of the support member 2.

Figure 3:
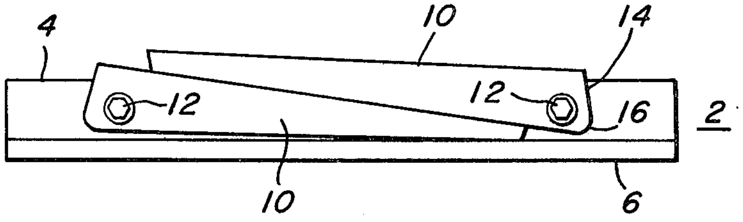
FIG. 3 is a side elevation view of the collapsible sawhorse of the present invention in a collapsed and inverted position for storage.

A leg 10 is attached by means of a pivotal connector 12 to each of the wedges 8. Each leg 10 is tapered, having a wider end proximate the pivotal connector 12, and a narrower end distant from the support member 2 when in standing position. The wider end of the leg 10 has a flat beveled portion 14 and an arcuate portion 16. In standing position, the flat beveled portion 14 of the leg 10 fits flush against the lower surface of the horizontal portion 6 of the support member 2. In this way, weight placed on the top surface of the support member 2 is transmitted directly to the legs without placing strain on the joints between the support member and the wedges, or on the joints in the support member itself. This allows for a stronger sawhorse with smaller parts than would otherwise be required in a collapsible sawhorse. The arcuate portion 16 of the leg 10 allows the leg 10 to be pivoted on the connector 12 and swung inwardly toward the support member 2 for storage. The tapered design of the legs 10 allows the legs 10 to nest in their stored position, as shown in FIG. 3.

The flat beveled portion 14 of the leg 10 resting against the lower surface of the horizontal portion 6 of the support member 2 rigidly secures the leg 10 in its extended position such that no tightening of the pivotal connector 12 is necessary to keep the legs 10 in their extended position. Preferably, a constant frictional force is applied at the pivot point, such as by tightening the pivot against washers. In this way the legs 10 do not readily slip out of their extended position, but may be moved to the folded position without loosening or disengaging of any bolts or latches. Thus the sawhorse of the present invention can be collapsed and carried away very quickly, and similarly may be extended and set up very quickly when needed.

Preferably, the vertical portion 4 of the support member 2 is provided with a hole 18 sized and shaped to serve as a handle to allow the folded sawhorse to be picked up and carried comfortably and easily. The support member and legs are preferably made of wood so that the sawhorse acts as an insulator to prevent electrical shock when construction work is being done. If the pivotal connectors 12 are made of plastic or other insulating material, the entire sawhorse will be electrically insulating, and the possibilities of electrical shock greatly reduced.

Figure 4:
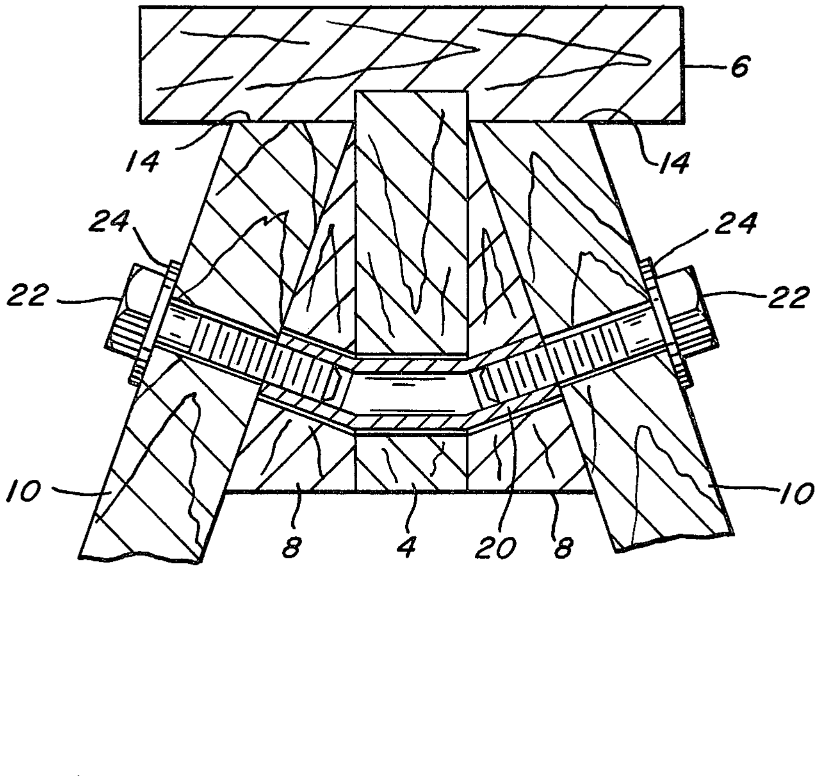
FIG. 4 is a section along lines IV—IV of FIG. 1 showing the construction of the pivot means in the preferred embodiment of the invention.

FIG. 4 shows a preferable arrangement for mounting the pivotal connectors in the sawhorse of the present invention. A hollow, threaded connector 20 is mounted in the wedges 8 and through the vertical portion 4 of the support member 2 and bolts 22 are inserted through the holes in the legs 10 and screwed into the threaded connector 20. In this way, the forces acting against the legs 10 pass all the way through the support member 2 and wedges 8 and thus do not put a strain on the joint between the support member 2 and the wedges 8. As previously mentioned, washers 24 are preferably inserted in the connection so that a constant frictional force is applied to the pivotal connection between the wedges 8 and the legs 10. It is, of course, possible to secure the legs 10 by other pivotal means, such as by a threaded rod extending through the wedges 8 and the legs 10 and secured with nuts at the end, or by connectors which do not pass all the way through the vertical portion 4 of the support member 2.

Figure 2:
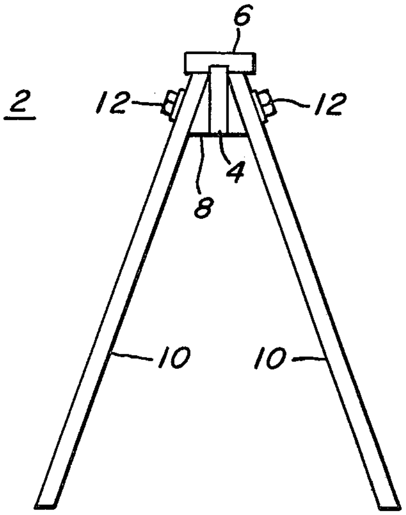
FIG. 2 is a front elevation view of the collapsible sawhorse of the present invention in its extended position.
Figure 5:
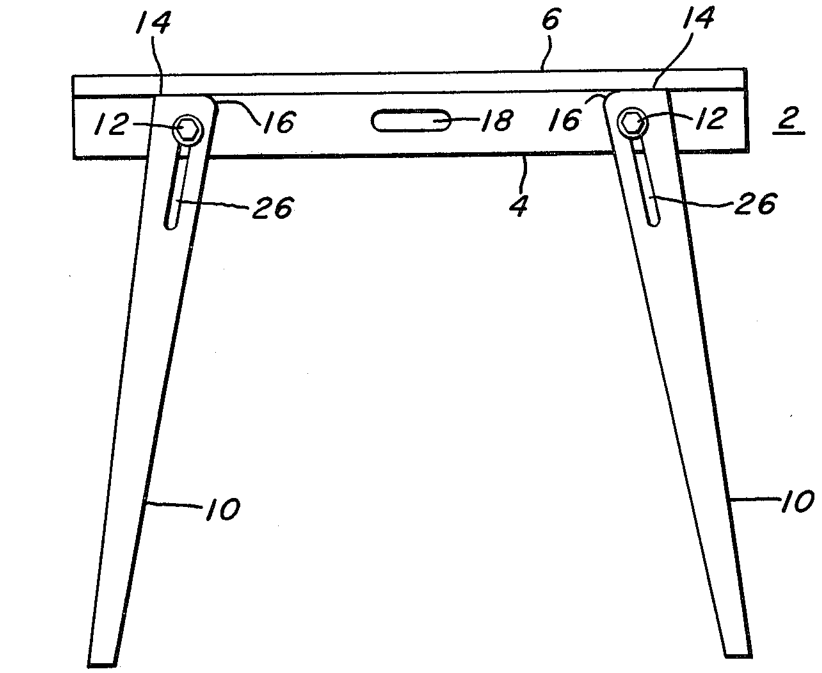
FIG. 5 is a side elevation view of an alternative embodiment of the collapsible sawhorse of the present invention in its extended position.
Figure 6:
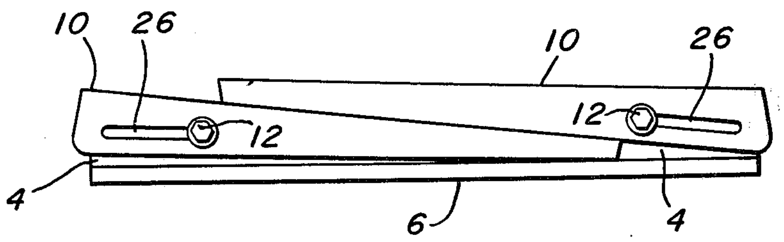
FIG. 6 is a side elevation view of an alternative embodiment of the collapsible sawhorse of the present invention in its collapsed and inverted position for storage.

In the design of the sawhorse shown in FIGS. 1, 2 and 3, the length of the legs 10 is limited to the distance between the pivotal connectors 12. Thus, if a taller sawhorse is desired, a longer support member 2 would be required. However, if a taller sawhorse is desired without extending the length of the support member 2, an alternative embodiment, as shown in FIG. 5, may be used. The pivotal connectors 12 are inserted through slots 26 in the legs 10. These slots 26 are as long as the extra length desired in the legs over that available with a pivot hole as shown in FIG. 1. When the legs 10 are in their extended position, the weight applied to the top surface of the support member 2 is directly applied to the legs 10 by means of the flat beveled portion 14 fitting against the lower surface of the horizontal portion 6 of the support member 2. Then, in the process of folding the legs 10, the legs 10 are moved such that the pivotal connectors 12 pass to the other end of the slot 26, allowing the legs to be folded in the manner previously described.

There has been described a collapsible sawhorse in which the weight applied to the sawhorse is directly passed to the legs by the contact of the flat beveled portion of the legs with the load bearing support member. This allows for a pivotal connection which does not have to bear weight, so that no loosening or tightening of bolts or latches is necessary to move the legs from their extended to their folded position and to reverse that operation. By this means, a compact sawhorse which may be easily stored and carried but which is strong enough to suppot heavy weights is provided.

I claim:

1. A collapsible sawhorse comprising:

a horizontally disposed support member of T-shaped cross section, having a vertical portion and a horizontal portion;

four wedges, attached in opposing pairs to the vertical portion of the support member, with the wider portion of each wedge disposed away from the horizontal portion of the support member;

pivotal connecting means attached to each of the wedges; and four tapered legs, each of said legs being pivotally attached to one of the wedges by the pivotal connecting means, at a point proximate the wider end of the leg, the wider end of each leg having an arcuate portion and a flat, beveled portion, such that when the marrower end of each leg is pivotally extended away from the support member, the flat, beveled portion of the leg is flush with the horizontal portion of the support member and gives support thereto.

2. A collapsible sawhorse as defined in claim 1 wherein the pivotal connecting means comprises a threaded connector passing through the vertical portion of the support member and one pair of wedges, and threaded means for pivotally securing the legs to the threaded connector.

3. A collapsible sawhorse as defined in claim 2 wherein the threaded connector is a hollow tube with internal threads.

4. A collapsible sawhorse as defined in claim 1 wherein the distance from the pivot point of each leg to the distant end of that leg is less than the distance between the pivotal connecting means.

5. A collapsible sawhorse as defined in claim 1 wherein each leg is longer than the distance between the pivotal connecting means, and each leg has a slot therein extending lengthwise of the leg, with the pivotal connecting means being located in said slot, such that when the leg is in its extended position, the pivotal connecting means is located at the end of the slot proximate the wider end of the leg, and when the leg is pivoted toward the support member, the leg may be moved longitudinally relative to the pivotally connecting means.

* * * * *